US007359711B2

(12) United States Patent
Edge et al.

(10) Patent No.: US 7,359,711 B2
(45) Date of Patent: Apr. 15, 2008

(54) METHODS AND APPARATUS FOR IMPROVING ACCURACY OF RADIO TIMING MEASUREMENTS

(75) Inventors: Stephen William Edge, San Diego, CA (US); Bollapragada V. J. Manohar, San Diego, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 713 days.

(21) Appl. No.: 10/460,982

(22) Filed: Jun. 13, 2003

(65) Prior Publication Data

US 2004/0087269 A1 May 6, 2004

Related U.S. Application Data

(60) Provisional application No. 60/423,343, filed on Oct. 31, 2002.

(51) Int. Cl.
*H04Q 7/20* (2006.01)
*H04M 11/04* (2006.01)
*H04B 1/16* (2006.01)

(52) U.S. Cl. .............. 455/456; 455/457; 455/404.2; 455/208; 455/265; 455/13.2; 375/144; 375/147; 375/148; 342/457; 342/387

(58) Field of Classification Search ........... 455/456, 455/457, 404.2, 208, 265, 13.2; 375/144, 375/147, 148; 342/457, 387
See application file for complete search history.

(56) References Cited

U.S. PATENT DOCUMENTS

| 6,108,558 | A | 8/2000 | Vanderspool, II | |
| 6,275,705 | B1 | 8/2001 | Drane et al. | |
| 6,356,763 | B1 * | 3/2002 | Kangas et al. | 455/456.1 |
| 6,445,928 | B1 | 9/2002 | Ruutu et al. | |
| 6,469,665 | B2 | 10/2002 | Porcino | |
| 6,697,629 | B1 | 2/2004 | Grilli et al. | |
| 6,775,242 | B2 | 8/2004 | Grilli et al. | |
| 6,941,144 | B2 | 9/2005 | Stein | |
| 6,952,570 | B2 * | 10/2005 | Nagayasu | 455/208 |
| 7,151,945 | B2 * | 12/2006 | Myles et al. | 455/502 |
| 2002/0107028 | A1 * | 8/2002 | Rantalainen et al. | 455/456 |
| 2002/0160788 | A1 | 10/2002 | Duffett-Smith et al. | |
| 2004/0058653 | A1 * | 3/2004 | Dent | 455/69 |
| 2004/0072582 | A1 | 4/2004 | Aljadeff et al. | |
| 2004/0087277 | A1 | 5/2004 | Edge et al. | |
| 2005/0117547 | A1 * | 6/2005 | Lu | 370/335 |

* cited by examiner

*Primary Examiner*—Matthew Anderson
*Assistant Examiner*—Wen Huang

(57) ABSTRACT

A system, method, apparatus, means, and computer program code for improving accuracy of radio timing measurements. According to some embodiments, a wireless terminal or other wireless device can make adjustments to a measurement made from a radio transmission source by adjusting timing measurements using a weighted average and/or synchronizing its timing to the timing of this or some other radio transmission source. The adjusted measurements can be obtained for times other than when the original measurements are made. Measurements for multiple radio transmission sources can then be adjusted to a common time wherein adjustment errors due to unknown timing drift in the radio sources and wireless terminal and Doppler errors due to unknown relative velocities can be reduced or eliminated.

8 Claims, 6 Drawing Sheets

METHODS AND APPARATUS FOR IMPROVING ACCURACY OF RADIO TIMING MEASUREMENTS

CROSS-REFERENCE TO RELATED APPLICATION

This application is related to, and claims priority to, U.S. provisional patent application Ser. No. 60/423,343, entitled METHODS FOR IMPROVING ACCURACY IN RADIO TIMING MEASUREMENTS, and filed Oct. 31, 2002, the entire contents of which are incorporated herein for all purposes.

BACKGROUND OF THE INVENTION

The present invention relates to a method and apparatus for improving the accuracy of radio timing measurements.

In wireless networks, a wireless handset or, more generally, any wireless terminal or wireless device, may need to perform radio timing measurements to support wireless access operation or other applications. Two examples of this occur in technologies to support precise geographic location of the wireless terminal. In GSM (Global System for Mobile Communications), a positioning technology known as E-OTD (Enhanced Observed Time Difference) requires a wireless terminal to measure the transmission timing references carried in the radio transmissions from three or more nearby GSM base stations. The wireless terminal is supposed to measure the exact transmission timing reference from each base station at the same instant in time. The transmission timing reference in GSM is related to the numbering of GSM frames, timeslots and bits transmitted from each base station such that a transmission timing reference for a particular base station would be given by the particular GSM frame number, timeslot number, bit number and fractional portion of a bit that had arrived at the wireless terminal at any specific time. In practice, the wireless terminal would capture a large number of bits from the base station, possibly spanning many GSM frames, and would compute the arrival time at the wireless terminal of a specific marker within this bit sequence, e.g., the start of the first bit in a particular GSM timeslot within some known GSM frame.

In another positioning technology known as A-GPS (Assisted-Global Positioning System), a wireless terminal is required to measure the exact code phase or, if signal reception is good, the exact GPS time indicated by the radio transmission from each one of several GPS satellites (normally at least five, although fewer will sometimes suffice) and at the same instant in time. Each GPS satellite transmits a unique and regularly repeating Gold Code that consists of 1023 chips and is exactly one millisecond in duration. With low signal strength (e.g., as may occur for a wireless terminal positioned indoors), it may only be possible for the wireless terminal to measure the portion of the current Gold Code, the so-called "code phase", that has arrived at the terminal at the designated measurement time. In that case, the wireless terminal would have determined a fractional millisecond portion of the transmission timing from this GPS satellite but not the full GPS time in terms of a particular day, hour, minute, second and millisecond. With better signal strength, the wireless terminal may be able to decode the GPS satellite transmission data (carried by the recurring Gold Code transmissions) or at least determine sufficient properties of this data to infer the complete GPS satellite time. As with E-OTD, the wireless terminal may have to capture some significant amount of GPS satellite transmission data and compute the arrival time of a particular marker in the transmission (e.g., the precise starting instant of a new Gold Code).

A main problem with both of these positioning technologies and with any other application that requires a wireless terminal to make or measure radio transmission timing from two or more radio transmission sources at the same instant in time is that a wireless terminal may only be able to measure one radio transmission source at a time. In order to obtain radio transmission timing measurements at the same instant in time, a wireless terminal would then need to adjust each transmission timing measurement, made at some other instant in time, to the measurement that would be expected (but cannot actually be made) at the designated common instant in time.

It would be advantageous to provide methods, means, computer code, and apparatus that overcame the drawbacks of the prior art. In particular, it would be desirable to provide methods, means, computer code, and apparatus that improved accuracy of radio timing measurements made by a terminal.

SUMMARY OF THE INVENTION

Embodiments of the present invention provide a system, methods, apparatus, means, and computer program code for improved accuracy of radio timing measurements. According to embodiments of the present invention, a terminal can make adjustments to one or more radio timing measurements made from a radio transmission source by synchronizing its own timing to the timing of either this or some other radio transmission source and/or adjusting the radio timing measurements using a weighted average. It should be understood that the term "terminal" as used herein can represent not only a wireless device serving a user of wireless services, such a cell phone, mobile phone, PDA, laptop or PC, but also an entity belonging to a wireless network such as a base station or Location Measurement Unit (LMU).

In some embodiments, in order to improve radio timing measurement accuracy, a terminal can make frequent measurements of some external radio transmission source having a more stable and accurate timing reference than that of the terminal itself either during the period in which other radio timing measurements were being made or continuously at all times. In such a scenario, it would be possible to lock the timing drift of the terminal to any timing drift for the radio source being monitored, although any wobble component of timing would remain separate and unsynchronized.

In some embodiments of adjusting a radio timing measurement for an external radio source, a time reference for the radio source at time $T_2$ is obtained from a weighted average of two (or more) measurements for the radio source, one made at some earlier time $T_1$ and one at some later time $T_3$. Each radio timing measurement is adjusted to give a time reference at the required time $T_2$ and the resulting adjusted time references are then averaged with the weight for each adjustment being inversely proportional to the time interval (according to the wireless terminal time source) over which the adjustment was made. In other embodiments, other weighting or averaging schemes may be used. The resulting weighted average can be shown to be free of errors due to both drift in the timing references for the terminal and the external radio source and movement of the terminal and/or external radio source over a limited period of time.

Additional advantages, and novel features of the invention shall be set forth in part in the description that follows, and in part will become apparent to those skilled in the art upon examination of the following or may be learned by the practice of the invention.

According to some embodiments of the present invention, a method for improving the accuracy of a timing measurement made by a terminal may include making a plurality of sequential timing measurements of a first radio transmission source, the first radio transmission source having a timing reference; determining a timing drift difference between the first radio transmission source and the terminal based, at least in part, on the plurality of sequential timing measurements; and determining an adjustment to a timing reference in the terminal based, at least in part, on the timing drift difference. In some other embodiments, a method for improving the accuracy of a timing measurement made by a terminal may include making a first timing measurement for a radio transmission source at a time $T^*_x$ according to a timing reference in the terminal; making a second timing measurement for the radio transmission source at a time $T^*_y$ according to a timing reference in the terminal; determining a third timing measurement for the radio transmission source at a time $T^*$ according to a timing reference in the terminal based, at least in part, on the first timing measurement; determining a fourth timing measurement for the radio transmission source at the time $T^*$ based, at least in part, on the second timing measurement; and determining a fifth timing measurement for the radio transmission source at the time $T^*$ based, at least in part, on the third timing measurement and the fourth timing measurement. In some other embodiments, an apparatus, device, system, computer code, or other means may implement some or all of the elements of one or more of the methods disclosed herein.

With these and other advantages and features of the invention that will become hereinafter apparent, the nature of the invention may be more clearly understood by reference to the following detailed description of the invention, the appended claims and to the several drawings attached herein.

DETAILED DESCRIPTION

Figure 1:
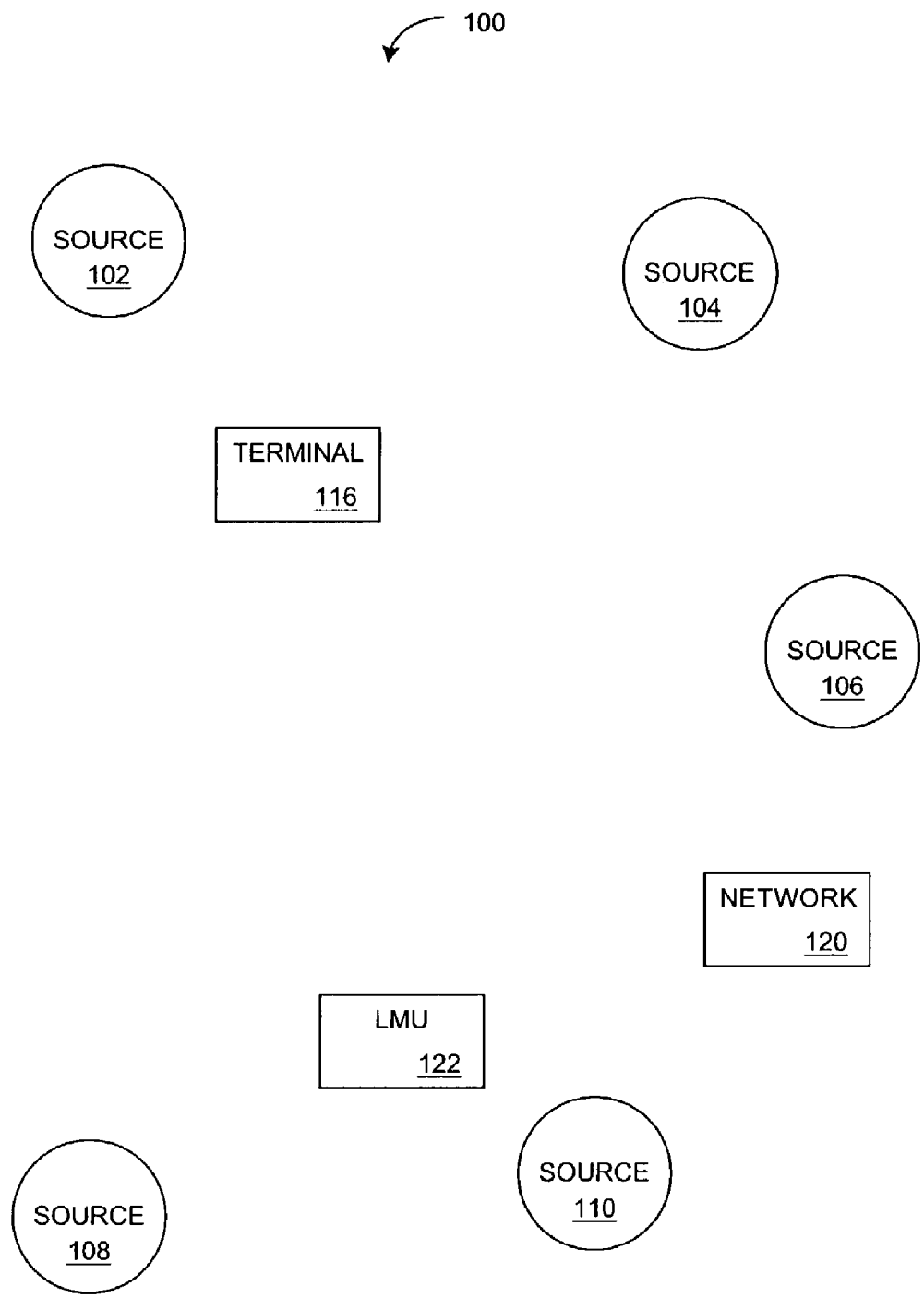
FIG. 1 is a block diagram of a system in accordance with the present invention.

Applicants have recognized that there is a market opportunity for systems, computer code, means and methods for improving the accuracy of radio timing measurements and for reducing errors when radio timing measurements are made from one or more external radio transmission sources.

One problem with A-GPS and E-OTD positioning technologies and any other application that requires a wireless terminal to measure radio transmission timing from two or more radio transmission sources at the same instant in time is that a wireless terminal may only be able to measure one radio transmission source at a time. In order to obtain radio transmission timing measurements at the same instant in time, a wireless terminal would then need to adjust each transmission timing measurement, made at some other instant in time, to the measurement that would be expected (but cannot actually be made) at the designated common instant in time. To perform this adjustment, the wireless terminal could make use of some internal clock source plus knowledge of the relationship between this internal clock source and the radio transmission measurement being adjusted. For example, suppose that a GSM wireless terminal is manufactured with an internal frequency source of one gigahertz (Ghz) and can thereby associate any event with an internal time source defined in units of one nanosecond. Suppose that the terminal measures the transmission timing from some nearby GSM base station A and detects the arrival of GSM frame 407, timeslot 0 and the start of bit number 0 at an internal time of 20.382709533 seconds. Suppose that the wireless terminal then measures timing from some other base station B and detects the arrival of GSM frame 1254, timeslot 0 and the start of bit 0 at an internal time of 22.527081402 seconds. If the wireless terminal needs to report the transmission timings from both base stations at the same instant in time (e.g., to support E-OTD), it might decide to adjust the transmission timing measurement for base station B to coincide with the measurement for base station A. This would mean calculating the GSM frame, timeslot and bit numbers for B that would have been measured by the wireless terminal at an internal time equal to 22.527081402 minus 20.382709533 which comes to 2.144371869 seconds earlier than the actual measurement of B. Knowing that each GSM frame, timeslot and bit are required by GSM standards to have exact durations of 60/13 (≈4.615) milliseconds (ms), 15/26 ms (≈0.577 ms) and 48/13 (≈3.692) microseconds (μs), respectively, it can be calculated that GSM frame 789, timeslot 3 and bit 13.869 from base station B would have arrived at the earlier measurement time. Mainly for brevity (to send fewer bits), the terminal could then calculate that the start of the next timeslot from base station B would arrive at the wireless terminal after a further time equal to (156.25–13.869) bits, or 142.381 bits, after the measurement from A. For E-OTD, this "Observed Time Difference" (OTD) value between the measurements for base stations A and B would be reported to the network along with the GSM frame, timeslot and bit number values for the base station A.

In the applications described above, a wireless terminal is making measurements of two or more different sources of radio transmission timing at different times and adjusting these measurements to a common time. If the wireless terminal is able to continuously measure some accurate external radio source of timing, then the adjustments can be made using this external time source and errors in the adjustment can be avoided. For example, some implementations of GPS receiver are able to continuously receive GPS signals from one or more satellites. The timing from one of these satellites could then be used to accurately adjust the measurements from all satellites to a common instant in time. Because GPS satellite timing is very precise, such adjustments will be very accurate and enable accurate location estimates. However, when a wireless terminal cannot continuously receive radio transmission timing from some accurate external source, it will need to make use of its own internal clock source, at least in part, to perform any adjustment. In GSM standards, the stability of the transmission timing from any base station or within a GSM terminal is only mandated to be within 0.05 or 0.1 parts per million (ppm), respectively. If the radio timing measurements of all radio sources were to take ten seconds, for example, that could mean up to one microsecond error in some of the adjustments. A one microsecond error is equivalent to around three hundred meters in distance error if the adjusted measurements were used to calculate location (since radio signals propagate at approximately 300,000,000 meters per second).

The present invention describes new methods to reduce the adjustment errors when radio timing measurements, made at different times, from two or more external radio transmission sources are adjusted to a common instant in time. For purposes of the present invention, it is assumed here that any special techniques to obtain radio timing measurements free of errors due to multipath propagation, interference, noise and other effects that may impair accuracy have already been applied. Thus, the radio timing measurements are considered to be as accurate as can possibly be obtained by the available hardware and software measurement techniques in the wireless terminal except for the need to adjust these measurements to some other instant in time.

Now referring to FIG. 1, a generic system 100 is illustrated that may be used for discussion of the present invention. The system 100 includes one or more radio transmission sources 102, 104, 106, 108, 110. In some embodiments, a radio transmission source may be or include a base station, GPS or other satellite, wireless LAN server, microwave transmitter, public television or radio transmitter, or other source or broadcaster or transmitter of timing information and different embodiments may use different combinations of radio sources or types of radio sources. In some embodiments, timing information or radio timing measurement data may be or include GPS Gold Code data or information, GSM timing reference or frame data or information, bit or chip related timing for CDMA or WCDMA, or timing data for other wireless technologies including, but not limited to, TDMA, wireless LAN, public radio or television, etc. Each source may include a clock or other time source for making or recording radio timing measurements, time stamping the transmission or reception of communications, or providing other timing information for use by the source or the system 100.

In addition to sources, the system 100 may include one or more terminals 116 that may detect or otherwise receive signals transmitted or otherwise provided by one or more of the sources 102, 104, 106, 108, 110 for purposes of or including determining the location of the terminal 116 or determining the location of another entity (e.g., one of the radio sources 102, 104, 106, 108, 110). In some embodiments, the terminal 116 may be or include a mobile and/or wireless device, such as a mobile telephone, handset, PDA, laptop computer, or other communication device. In other embodiments, the terminal may be an entity, or part of an entity, belonging to a wireless network (e.g., a base station or a Location Measurement Unit (LMU)). The terminal 116 may be stationary or mobile. The terminal 116 may include an internal clock or other time source or timing device for making or recording radio timing measurements, time stamping the transmission or reception of communications, or providing other timing information for use by the terminal 116 or the system 100.

In some embodiments, the system 100 also may include a network or other device 120 to which the terminal 116 may communicate. For example, the network 120 may include, or be part of, a GSM, GPRS, TDMA, CDMA or WCDMA wireless network. As used herein, the term "network" also may refer to the network 120 or to a device or group of devices within or forming part of the network 120.

In some embodiments, the network 120 might be or include the Internet, the World Wide Web, or some other public or private computer, cable, telephone, client/server, peer-to-peer, radio or communications network or intranet, as will be described in further detail below. The communications network 120 also can include other public and/or private wide area networks, local area networks, wireless networks, data communication networks or connections, intranets, routers, satellite links, microwave links, cellular or telephone networks, radio links, fiber optic transmission lines, ISDN lines, T1 lines, DSL, etc. Moreover, as used herein, communications include those enabled by wired or wireless technology. In some embodiments, the network may include, or be in contact with, devices or entities such as Location Measurement Units (LMUs) 122 related to a specific communication architecture, protocol, or implementation (e.g., GSM). In some embodiments implementing or using GSM, a Location Measurement Unit may make radio measurements to support positioning or the location determination of a terminal (e.g., the terminal 116).

To start the discussion and mathematical evaluation of the present invention, some preliminary definitions are given. Define three sets of time references $(T_1, T_2, T_3, \ldots)$, $(T^*_1, T^*_2, T^*_3, \ldots)$, $(T''(T_1), T''(T_2), T''(T_3), \ldots)$ where:

$T_1, T_2, T_3, \ldots$ are succeeding instants in time (e.g., $T_1 < T_2 < T_3 < \ldots$) according to some absolute and correct time source;

$T^*_1, T^*_2, T^*_3 \ldots$ are the times recorded at these instants by an internal clock source in the terminal 116; and $T''(T_1), T''(T_2), T''(T_3), \ldots$ are the times actually measured, or that would be measured, at these instants by the terminal 116 from some external radio transmission source n (e.g., the source 110).

It may be supposed for simplification, but not limitation, that the same units of time are employed for all three time sources. If that were not the case initially, one common unit of time, u1 say, could be chosen with any time reference T that was expressed using a different unit, u2 say, converted into it using the product of T with the quotient (u2/u1). Thus, it is assumed here that any such conversion has already been done. Although the three sets of measurements can share a common time unit, they need not share a common time origin whereby identical values for corresponding measurements, $T_i$, $T^*_i$ and $T''(T_i)$ say, would occur with perfect timing accuracy. Instead, each measurement can be relative to a different time origin because in the results that follow, time origins are not present since only differences between measurements of the same source and errors in measurements appear.

Suppose that the terminal 116 needs to know or report the value of $T''(T_2)$ but in fact was only able to measure $T''(T_1)$, then the missing value can be derived by adding in the interval of time between these measurements which, according to a clock in the terminal 116, would be $(T^*_2 - T^*_1)$. This gives:

$$T^n(T_2)^\# = \text{Approximate derived value of } T^n(T_2) \quad (1)$$

$$= T^n(T_1) + (T^*_2 - T^*_1) \quad (2)$$

The error in the above calculation is obtained as follows:

$$E(T^n(T_2)^\# / T^n(T_1)) = \text{error in deriving } T^n(T_2)^\# \text{ using } T^n(T_1) \quad (3)$$

$$= T^n(T_2)^\# - T^n(T_2)$$

$$= (T_2^* - T_1^*) - (T^n(T_2) - T^n(T_1)) \quad (4)$$

$$= [(T_2^* - T_1^*) - (T_2 - T_1)] - [(T^n(T_2) - T^n(T_1)) - (T_2 - T_1)] \quad (5)$$

$$= E^*(T_1, T_2) - E^n(T_1, T_2) \quad (6)$$

where $E^*(t_m, t_n)$ equals the error in any time interval $(t_n-t_m)$ using the clock or other timing device in the terminal 116 and $E^n(t_m, t_n)$ equals the error in any time interval $(t_n-t_m)$ using the clock or other timing device in the radio source n (e.g., the source 110).

The error in the derivation of the adjusted radio timing for the radio transmission source n is given by the difference in errors of the adjustment interval as measured by the internal clock of the terminal 116 and as would be measured by the timing of the radio source n. The former error occurs because the clock in the terminal 116 was used to perform the adjustment. The latter error occurs because at the required measurement time, $T_2$, the timing from the radio source n may have "wandered" slightly from what it would have registered with perfect timing accuracy.

Figure 2:
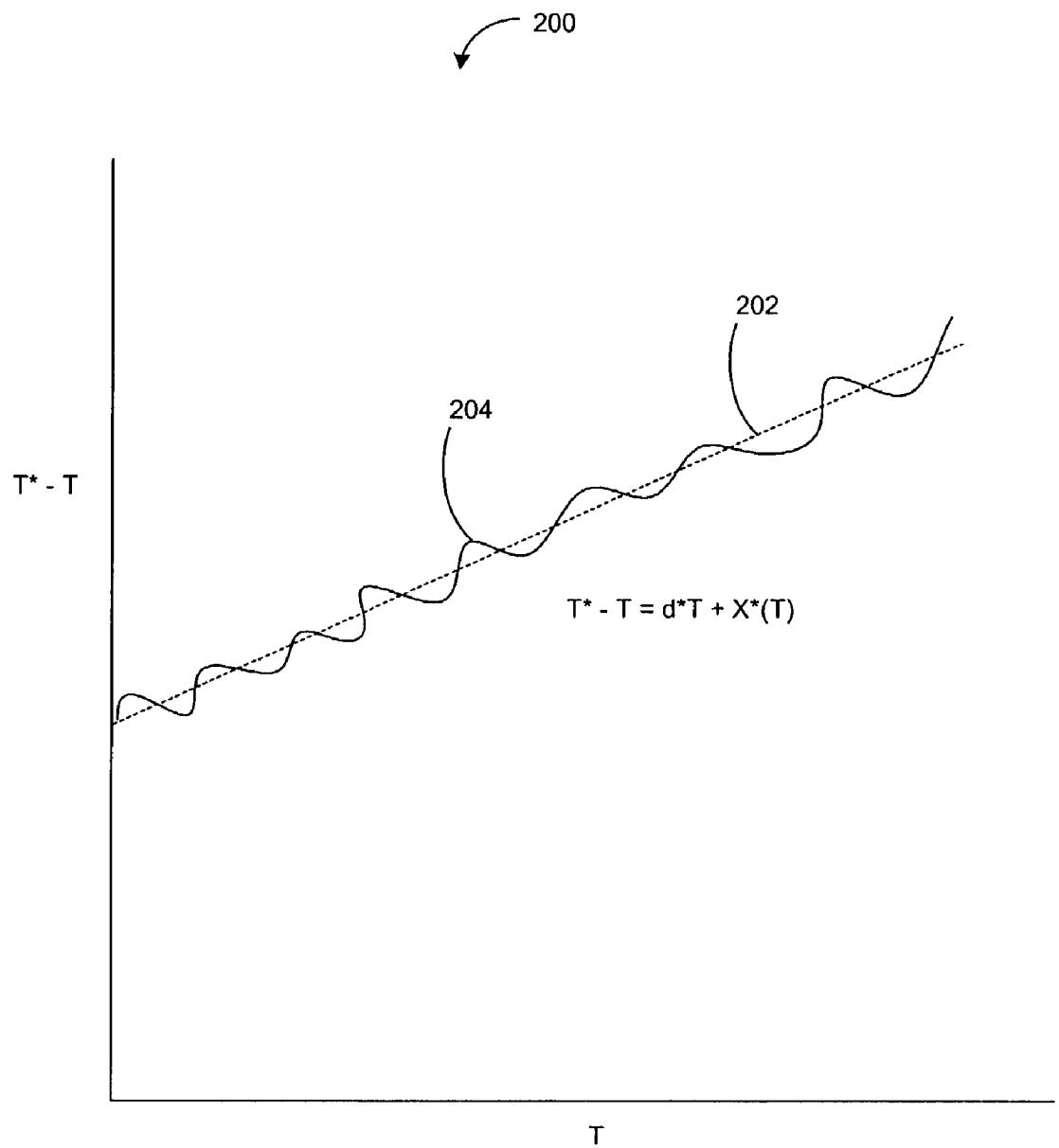
FIG. 2 is a diagram of drift and wobble components of a timing source for a terminal.

In order to precisely evaluate improved methods for reducing errors, some model is needed for the timing errors of the terminal 116 and the external radio transmission source. Such clock sources may exhibit errors containing a constant drift factor and a random wobble. This can be defined mathematically as follows.

$$T^n(T) = R^n + T + d^n T + X^n(T) \quad (7)$$

$$T^* = R^* + T + d^* T + X^*(T) \quad (8)$$

where $R^n$, $R^*$ are distinct time origins for T=0; $d^n$, $d^*$ equal drift factors for the radio source n and the terminal 116, respectively; and $X^n(T)$, $X^*(T)$ equals wobble at time T for the radio source n and the terminal 116, respectively The drift factors would normally be quite small, e.g., GSM mandates a drift factor of less than 0.05 ppm for any base station and less than 0.1 ppm for any mobile terminal. The drift factors are assumed to remain constant, but only over the limited periods considered herein during which radio transmission sources, adjusted to a common instant in time, are being measured. The wobbles $X^n(T)$ and $X^*(T)$ represent small fluctuations in timing error, e.g., a sinusoidal component, that will have a high autocorrelation over any small interval of time but can be treated as independent random variables with expectations of zero over any long time period. Intuitively, the drift factor occurs because the frequency source for any clock contains some constant error, i.e., is faster or slower than it should be. Wobble may be the result of random fluctuations, e.g., of temperature or electromagnetic field. Graph 200 in FIG. 2 illustrates the drift component 202 and the wobble component 204 in equation (8).

The errors in the individual clock sources in equation (5) can now be expressed as:

$$E^*(T_1, T_2) = d^*(T_2-T_1) + (X^*(T_2) - X^*(T_1)) \quad (9)$$

$$E^n(T_1, T_2) = d^n(T_2-T_1) + (X^n(T_2) - X^n(T_1)) \quad (10)$$

The ensuing error expressed by equation (5) can now be obtained as:

$$E(T^n(T_2)^\# / T^n(T_1)) = E^*(T_1, T_2) - E^n(T_1, T_2) \quad (11)$$

$$= [d^*(T_2 - T_1) + (X^*(T_2) - X^*(T_1))] - [d^n(T_2 - T_1) + (X^n(T_2) - X^n(T_1))]$$

$$= [d^*(T_2 - T_1) - d^n(T_2 - T_1)] + [(X^*(T_2) - X^*(T_1)) - (X^n(T_2) - X^n(T_1))]$$

$$= [(d^* - d^n)(T_2 - T_1)] + [(X^*(T_2) - X^n(T_2)) - (X^*(T_1) - X^n(T_1))]$$

$$= E^{*n}(T_1, T_2) \quad (12)$$

where $E^{*n}(T_1, T_2) = d^{*n}(T_2-T_1) + (X^{*n}(T_2) - X^{*n}(T_1)) \quad (13)$ $$d^{*n} = d^* - d^n \quad (14)$$

$$X^{*n}(T) = X^*(T) - X^n(T) \quad (15)$$

By comparison of equation (13) with equation (9) or (10), it can be seen that the overall error contains a drift $d^{*n}$ equal to the difference between the individual drifts for the terminal 116 and radio source n and a wobble $X^{*n}(T)$ equal to the difference between the individual wobbles. The error due to drift remains proportional to time and will thus increase in proportion to the interval of adjustment. The error due to wobble will have a zero expectation and a variance that is either constant or increases with time (if either of the source n or terminal 116 wobbles had such a variance).

The preceding analysis is applicable to both a moving and a stationary terminal (because no assumption was made regarding the state of motion of the terminal 116). In the case of a moving terminal 116, the transmission timing observed from any radio source will exhibit some additional errors due to Doppler shift. To isolate these, suppose that the timing references for the radio source n, $(T^n(T_1), T^n(T_2), T^n(T_3), \ldots)$, are those that would be observed by the terminal 116 when stationary at the absolute times $(T_1, T_2, T_3, \ldots)$ and at the times according to the terminal 116 of $(T^*_1, T^*_2, T^*_3, \ldots)$.

Let $T^{n,v}(T_1), T^{n,v}(T_2), T^{n,v}(T_3), \ldots$ be the times observed from the same radio source n by the terminal 116 when non-stationary and assume (without loss of generality) that the position of the terminal 116 when non-stationary is the same as the position of the terminal 116 when stationary at time $T_1$. This implies:

$$T^{n,v}(T_1) = T^n(T_1)$$

For simplification, assume that the terminal 116 when non-stationary is moving at some constant velocity. This will not normally be the case, but over a period of just a second or two, this will generally be a good approximation. It is also assumed that the radio transmission source n (e.g., the source 104) is distant from the terminal 116, at least compared with the distance traveled by the terminal 116 over the time period of the adjustments (this simplifies the geometry).

Let $v_n$ equal the (axial) velocity component of the terminal 116 towards the radio source n. Note that a negative value for $v_n$ would signify velocity away from the radio transmission source n. The axial velocity component applies to the straight line connecting the terminal 116 to the radio source n at any time. If the radio source n was a GPS satellite then there would be an altitude component to this velocity. If the radio source n is also moving, as in the case of a GPS satellite, then $v_n$ would denote the axial velocity of the terminal relative to the radio source n. If the timing $T^{n,v}(T_2)$ of the radio transmission source n that would be observed at time $T_2$ is now derived from a measurement $T^n(T_1)$ made at $T_1$ in the same way as in equation (2) (i.e., without allowance for the effects due to velocity), the results will be as follows:

$$T^{n,v}(T_2)^\# = \text{Approximate derived value of } T^{n,v}(T_2) \quad (16)$$
$$= T^n(T_1) + (T_2^* - T_1^*)$$

Because the terminal 116 travels a distance $v_n(T_2-T_1)$ closer to the radio source n following the measurement $T^n(T_1)$, it would observe a timing reference from n that would not arrive at the terminal 116 if stationary (relative to the radio source n) until a time $[v_n(T_2-T_1)/c]$ later, where c is the velocity of radio waves (of light). The true measurement that would actually be made at $T_2$ is thus as follows:

$$T^{n,v}(T_2) = T^n(T_2 + v_n(T_2-T_1)/c) \quad (17)$$

If the radio source timing is again modeled as in equation (7), as a combination of drift and wobble, then equation (17) can be expanded as follows:

$$T^{n,v}(T_2) = R^n + T_2 + v_n(T_2-T_1)/c + d^n(T_2 + v_n(T_2-T_1)/c) + X^n(T_2 + v_n(T_2-T_1)/c) \quad (18)$$

the error in the calculated value for $T^{n,v}(T_2)^\#$ in equation (16) is then obtained from equation (18) using the drift and wobble equations (9) and (10) as:

$$E(T^{n,v}(T_2)^\# / T^n(T_1)) = \text{error in deriving } T^{n,v}(T_2)^\# \text{ using } T^n(T_1) \quad (19)$$
$$= T^{n,v}(T_2)^\# - T^{n,v}(T_2)$$
$$= T^n(T_1) + (T_2^* - T_1^*) - T^{n,v}(T_2)$$
$$= [R^n + T_1 + d^n T_1 + X^n(T_1)] +$$
$$[(R^* + T_2 + d^* T_2 + X^*(T_2)) -$$
$$(R^* + T_1 + d^* T_1 + X^*(T_1))] -$$
$$[R^n + T_2 + v_n(T_2-T_1)/c +$$
$$d^n(T_2 + v_n(T_2-T_1)/c) +$$
$$X^n(T_2 + v_n(T_2-T_1)/c)]$$
$$= [(d^* - (d^n + v_n/c))(T_2-T_1)] - \quad (20)$$
$$d^n(v_n/c)(T_2-T_1) + [X^n(T_1) -$$
$$X^n(T_2 + v_n(T_2-T_1)/c)] +$$
$$X^*(T_2) - X^*(T_1)]$$
$$\approx [(d^* - (d^n + v_n/c))(T_2-T_1)] + \quad (21)$$
$$[X^*(T_2) - X^n(T_2 + v_n(T_2-T_1)/c)] -$$
$$X^*(T_1) - X^n(T_1)]$$
$$= (d^* - d^{n,v})(T_2-T_1) + [(X^*(T_2) - \quad (22)$$
$$X^{n,v}(T_2)) - (X^*(T_1) - X^{n,v}(T_1))]$$

where $d^{n,v} = d^n + v_n/c$ \quad (23)

$$X^{n,v}(T) = X^n(T + v_n(T-T_1)/c) \quad (24)$$

In obtaining equation (21) from equation (20), the small second order term involving the product of $d^n$ with $(v_n/c)$ has been ignored. Equation (22) is equivalent to equation (11) for the stationary case with a drift $d^{n,v}$ for the radio source n that is increased by an amount $v_n/c$ due to (and proportional to) the relative velocity of the terminal 116 and with a wobble $X^{n,v}(T)$ that is the original wobble displaced forward in time by $v_n(T-T_1)/c$. A typical maximum speed $v_n$ for the terminal 116 would be around ninety miles per hour (assuming location restricted to terminals in road vehicles and not in high speed trains or airplanes). This is equivalent to a drift $v_n/c$ of around 0.134 ppm when the radio source n is fixed as would be the case, for example, with GSM E-OTD. For example, for GSM, this means that the natural drift in a clock at a source can be increased or reduced from the perspective of a moving terminal 116 by almost three times the maximum drift allowed in GSM for the base station.

Equations (22) to (24) show that movement of the terminal 116 (at a constant velocity) can be treated as equivalent to the assignment of a new drift and wobble to the radio source n. Since the methods claimed here for reducing or eliminating the effects of drift and wobble in the timing of the terminal 116 and radio source n do not require knowledge of these, the methods will be equally applicable to moving as well as stationary terminals. Hence in the mathematical evaluations of the various improvements, arbitrary drift and wobbles can be assigned to the radio source n that represent any combination of timing inaccuracy in the radio source n and velocity of the terminal 116.

In the case of a moving radio source n (e.g., a GPS satellite), the above statement also applies, except that the drift introduced by a high speed radio source (e.g., GPS satellite) could be much greater and could require compensation by other methods. For example, the velocity of a GPS satellite is around four kilometers per second and, in an axial direction, towards or away from a point on the earth's surface could sometimes attain around one kilometer per second. The associated drift $v_n/c$ is then around three ppm which, if not removed, will introduce much greater errors into any timing adjustment. To reduce or eliminate such errors, one of two approaches can be followed. First, the invention and associated procedures described herein could be employed directly to the radio timing measurements observed in the wireless terminal from the moving radio source without other forms of error compensation. In that case, errors in any adjustment of the observed timing of the radio source n due to the drift $v_n/c$ would be reduced or eliminated provided the relative axial velocity $v_n$ remained constant or almost constant during the period over which the measurement was adjusted. Alternatively, if the velocity and trajectory of the moving radio source n can be obtained from other data, e.g., as is possible for a GPS satellite using ephemeris data broadcast by the satellite, then it would be possible for the wireless terminal to calculate a modified radio timing measurement $T^{n,v}(T)\#$ for the source n, based on the observed measurement $T^{n,v}(T)$ and knowledge (approximate or precise) of the true measurement time T, giving the measurement the wireless terminal would observe if the relative axial velocity $v_n$ was zero. In general such a modified measurement will still contain an error component, for example, a constant drift if the terminal itself is moving at an unknown velocity. If this error component consists solely of a constant drift and wobble, then the methods described herein further down may also be employed to reduce or eliminate such an error when the modified radio timing measurement $T^{n,v}(T)\#$ needs to be adjusted to a different time than when the measurement was made.

Based on the initial mathematical description provided above, methods to reduce and possibly eliminate timing error are now discussed in more detail below.

Process Description

In some wireless networks, it may be necessary to synchronize the internal timing source for a terminal with the timing provided by a base station or other radio transmission source currently serving the terminal. For example, in GSM, a terminal (e.g., the terminal 116) is required to compare its own clock source with that derived from the radio transmission of a serving base station (e.g., the source 104). Whenever the time difference exceeds two microseconds (2 μs), the terminal must adjust its own clock source in steps of ¼ bit period (about 0.92 μs) every 1 to 2 seconds until the time difference has been reduced to less than ½ bit period (about 1.85 μs). This is done to maintain correct GSM transmission and reception operation at the terminal. However, it is not currently required to perform this in order to improve the accuracy of radio timing measurements for such applications as E-OTD in GSM. The accuracy of the synchronization achieved by this GSM requirement is also not sufficient for high precision applications like positioning of a wireless terminal—since synchronization to within ½ bit period will allow timing errors of up to around 1.85 μs which equates to a distance error of around 550 meters (after multiplication by the speed of light).

Adjustment Using Synchronization of Terminal Timing to Timing from Another Source In order to improve radio timing measurement accuracy, a terminal (e.g., the terminal 116) can make frequent measurements of some external radio transmission source (e.g., the source 102) having a more stable and accurate timing reference than that of the terminal itself either during the period in which other radio timing measurements are being made or continuously at all times. In such a scenario, it would be possible (as demonstrated further herein) to lock the timing drift of the terminal to any timing drift for the radio source being monitored, although the wobble component of timing would remain separate and unremoved. In equation (11), the error in any adjustment for some other radio source n would then become:

$$E(T^n(T_2)^\# / T^n(T_1)) = [(d^* - d^n)(T_2 - T_1)] + [(X^*(T_2) - X^n(T_2)) - \quad (25)$$
$$(X^*(T_1) - X^n(T_1)$$
$$= [(d^s - d^n)(T_2 - T_1)] + [(X^*(T_2) - X^n(T_2)) -$$
$$(X^*(T_1) - X^n(T_1))]$$

where $d^s$ equals the drift factor for the external radio source being monitored.

Equation (25) can reduce errors because the drift $d^s$ for the radio source being monitored would generally be much less than the uncorrected drift $d^*$ for the terminal. For example, if the timing reference from a GPS satellite were to be monitored, the drift $d^s$ would be effectively zero. If the serving base station was monitored instead, the error due to drift would be eliminated in the case that the radio source n being measured was also the serving base station.

The correction of the clock reference for the terminal that is needed for normal wireless operation (e.g., as described previously for GSM) and that is supported by monitoring the transmission from the serving base station can be a separate and independent process to that of synchronizing the timing drift of the terminal to some external radio source (either the serving base station or some other source like a GPS satellite). The former process involves the adjustment of timing counters maintained by the terminal, e.g., frame number, timeslot number, bit number, quarter bit number for GSM (analogous to hour, minute and second values for a normal clock). The latter process can instead correspond to the addition or subtraction of a calculated amount to any interval of time computed by the internal clock source of the terminal. In this case, the terminal could maintain separate counters of elapsed time that would not be reset whenever the normal clock counters of the terminal were adjusted for the purposes of maintaining correct wireless operation. Instead these separate counters would only be adjusted for the purpose of accurately measuring time delay and time references from other radio sources. One method of performing this adjustment is described below.

Let $T_1, T_2, \ldots T_m$ (m>1) be sequential absolute times at which a terminal (e.g., the terminal 116) measures the time reference from some external radio transmission source s (e.g., the source 104). Let $T^s(T_1), T^s(T_2), \ldots T^s(T_m)$ be the corresponding time reference measurements obtained by the terminal for the radio source s. Let $T^*_1, T^*_2, \ldots T^*_m$ be the corresponding time references according to the terminal clock source.

$$\text{Let } \Delta T_i = T_i - T_{i-1}; \Delta T^s(T_i) = T^s(T_i) - T^s(T_{i-1}); \Delta T^*_i = T^*_i - T^*_{i-1} (1 < i \leq m) \quad (26)$$

$$\text{Let } \Delta d_1 = 0 \quad (27)$$

$$\text{And } \Delta d_i = w \, \Delta d_{i-1} + (1-w)(\Delta T^s(T_i) - \Delta T^*_i)/\Delta T^*_i (1 < i \leq m) \quad (28)$$

$$\text{Where } w = \text{weighting factor } (0 < w < 1) \quad (29)$$

As will be demonstrated further down, the value $\Delta d_i$ in equation (28) is a good approximation for the difference, $d^s - d^*$, between the timing drift of the radio source s and that of the terminal and can be used to synchronize the clock source in the terminal with that in the radio sources. As also shown further down, the weighting factor w in equation (28) would be set close to one if the timing from s is very accurate and stable (e.g., a GPS satellite) but should be smaller if s has less stable timing (e.g., s is the serving base station). The properties of $\Delta d_i$ are now derived following m−1 applications of equation (28) (i.e., are derived when i=m) assuming that the terminal and radio source s have drift and wobble components as defined in equations (7) and (8) above.

$$\Delta d_m = (1-w)(\Delta T^s(T_m) - \Delta T^*_m)/\Delta T^*_m + \quad (30)$$
$$(1-w)w(\Delta T^s(T_{m-1}) - \Delta T^*_{m-1})/\Delta T^*_{m-1} + \ldots +$$
$$(1-w)w^{m-2}(\Delta T^s(T_2) - \Delta T^*_2)/\Delta T^*_2$$
$$= (1-w)\sum (i=2 \text{ to } m) w^{m-i}(\Delta T^s(T_i) - \Delta T^*_i)/\Delta T^*_i$$
$$= (1-w)\sum (i=2 \text{ to } m) w^{m-i}[(\Delta T_i + d^s\Delta T_i +$$
$$X^s(T_i) - X^s(T_{i-1})) - (\Delta T_i + d^*\Delta T_i +$$
$$X^*(T_i) - X^*(T_{i-1}))]/$$
$$(\Delta T_i + d^*\Delta T_i + X^*(T_i) - X^*(T_{i-1}))$$
$$= (1-w)\sum (i=2 \text{ to } m) w^{m-i}[(d^s - d^*)\Delta T_i +$$
$$(X^s(T_i) - X^*(T_i)) - (X^s(T_{i-1}) - X^*(T_{i-1}))]/$$
$$(\Delta T_i + d^*\Delta T_i + X^*(T_i) - X^*(T_{i-1}))$$
$$\approx (1-w)\sum (i=2 \text{ to } m) w^{m-i}[(d^s - d^*) + \quad (31)$$
$$X^{s*}(T_i)/\Delta T_i - X^{s*}(T_{i-1})/\Delta T_i]$$

-continued $$\approx (d^s - d^*) + (1-w)X^{s*}(T_m)/\Delta T_m - \quad (32)$$
$$(1-w)w^{m-2}X^{s*}(T_1)/\Delta T_2 +$$
$$(1-w)\sum (i=2 \text{ to } m-1)w^{m-1-i}$$
$$[wX^{s*}(T_i)/\Delta T_i - X^{s*}(T_i)/\Delta T_{i+1}]$$

where $X^{s*}(T) = X^s(T) - X^*(T)$ (33)

Equation (31) follows from (30) by ignoring small second order terms involving a product of two drift terms, two wobble terms or a drift and a wobble term. Equation (32) follows from (31) for large m. Except for the first (i=m) wobble term in equation (32), the remaining wobble terms will be small and will tend to zero for large m (sum of independent random variables with zero expectation). In fact, for large m and if the timing intervals, $\Delta T_i$, are all identical and equal to $\Delta T$, equation (32) simplifies to:

$$\Delta d_m = (d^s - d^*) + (1-w)X^{s*}(T_m)/\Delta T - (1-w)^2\Sigma(i=2 \text{ to } m-1)w^{m-1-i}X^{s*}(T_i)/\Delta T \quad (34)$$

Equations (32) and (34) show more clearly that w should be close to one for an accurate and stable radio source s, since then the wobble terms are multiplied by small factors of (1−w) and (1−w) squared. If the drift $d_s$ for the radio source s may vary itself over time, then a smaller value of w is more appropriate.

The correction in drift obtained from the method embodied in equations (26) to (29) will be a good approximation to the difference in drift, $d^s - d^*$, between the radio source s and the terminal, as shown by the derivation of equations (32) and (34). In order to make use of this, any interval in time calculated using the timing source of the terminal would be adjusted as follows.

Let $\Delta T$ = correct interval of time, $T2 - T1$, (35)
 from time $T1$ to time $T2(T1 < T2)$.
Let $\Delta T^*$ = corresponding interval of time, $T2^* - T1^*$,
 measured by the terminal.
Let $\Delta T^{**}$ = adjusted interval of time measured
 by the terminal
where $\Delta T^{**} = \Delta T^* + \Delta d_m \Delta T^*$
$$\approx \Delta T^* + (d^s - d^*)\Delta T^* \quad (36)$$
$$= \Delta T + d^*\Delta T + X^*(T2) - X^*(T1) + (d^s - d^*)\Delta T^*$$
$$= \Delta T + d^s\Delta T + X^*(T2) - X^*(T1)$$

$\Delta T^*$ is the interval of time actually measured by the terminal using its own clock source while $\Delta T^{**}$ is an adjusted interval derived from $\Delta T^*$ using the estimate $\Delta d_m$ for the difference between the timing drift of the terminal and that of the radio source s. Equation (36) shows that the adjusted interval $\Delta T^{**}$ equals the true time interval $\Delta T$ plus an error due to the clock drift of the radio source s and the wobble of the terminal. In other words, the clock drift for the terminal has been synchronized to the clock drift for the radio source s while the wobble component for the terminal remains unaffected.

The value for $\Delta T^{**}$ as determined by equation (35) will tend to be a more accurate value for the interval of time between T1 and T2 than $\Delta T^*$. In particular, if the timing references for both the terminal and the radio transmission source contain error components comprising constant drifts where each error component increases or decreases with time at a constant rate, the time interval estimate $\Delta T^{}$ will contain an error component comprising the constant timing drift of the radio source but no error component due to the timing drift of the terminal. If the timing drift for the radio source is less than that for the terminal, the adjusted interval $\Delta T^{}$ will be more accurate than the measured interval $\Delta T^*$.

Figure 3:
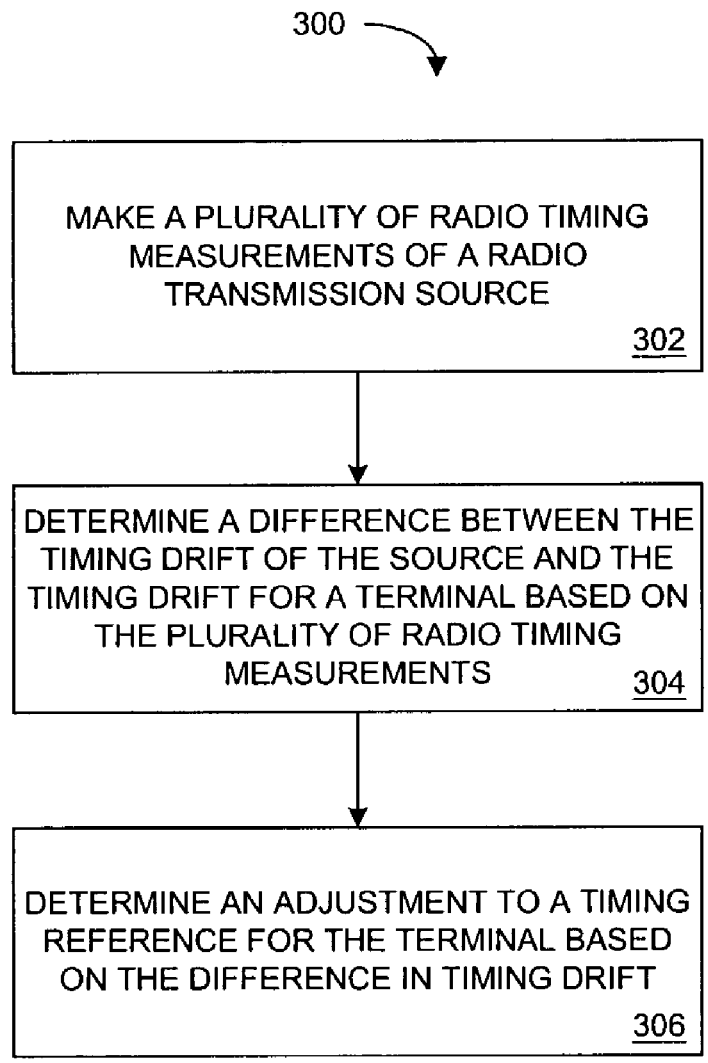
FIG. 3 is a flowchart of a first embodiment of a method in accordance with the present invention.

Now referring to FIG. 3, a flowchart 300 illustrates an embodiment of a method in accordance with the present invention that can be used to implement the process described above. In some embodiments, the method 300 may be implemented by a terminal.

During a step 302, a terminal (e.g., the terminal 116) makes a plurality of sequential radio timing measurements (i.e., radio timing measurements taken at different times) of a first radio transmission source (e.g., the source 102). The terminal 116 may include a clock or other source of timing. The radio transmission source 102 may include a clock or other source of timing that is more accurate than the clock or timing source in the terminal 116. In some embodiments, the step 302 may include determining sequential timing measurements $T^s_1, T^s_2, \ldots T^s_m$ (m>1) for the radio transmission source.

During a step 304, the terminal 116 may determine a difference between the timing drift for the source 102 and the timing drift of the terminal 116. For example, the terminal 116 may determine the difference between the drift of the source 102 and terminal 116 as described above using two or more of the radio timing measurements made during the step 302. During a step 306, an adjustment to the clock or other timing reference in the terminal 116 can be determined based on the difference between the timing drift of the source 102 and the timing drift of the terminal 116.

In some embodiments, the step 306 may include determining a first instant in time according to the timing reference in the terminal; determining a second instant in time according to the timing reference in the terminal; determining a first interval of time between the first instant in time and the second instant in time; and determining a second interval of time between the first instant in time and the second instant in time based, at least in part, on the first interval of time and the difference between the timing drift for the source 102 and the timing drift of the terminal 116.

In addition, the method 300 may include making a first measurement of radio timing information for a second radio transmission source at the first instant in time; and determining a second measurement of radio timing information for the second radio transmission source at the second instant in time based, at least in part, on the first measurement and the second interval of time. Furthermore, in some embodiments, the method 300 may include making a third measurement of radio timing information for the second radio transmission source at a third instant in time according to the timing reference for the terminal; determining a third interval of time between the third instant in time and the second instant in time; determining a fourth interval of time between the third instant in time and the second instant in time based, at least in part, on the third interval of time and the difference between the timing drift for the source 102 and the timing drift of the terminal 116; determining a fourth measurement of radio timing information for the second radio transmission source at the second instant in time based, at least in part, on the third measurement and the fourth interval of time; and determining an averaged measurement of radio timing for the second radio transmission source at the second instant in time based, at least in part, on the second and the fourth measurements of radio timing information for the second radio transmission source. The first and second radio transmission sources may be the same source or different sources.

In some embodiments, the step 306 may include determining timing references $T^*_1, T^*_2, \ldots T^*_m$ for the terminal, wherein $T^*_1, T^*_2, \ldots T^*_m$ correspond to the sequential timing measurements $T^s_1, T^s_2, \ldots T^s_m$, respectively, for the first radio transmission source; and determining $\Delta d_m$, wherein $\Delta d_m$ is the timing drift difference obtained, at least in part, from the timing references $T^*_1, T^*_2, \ldots T^*_m$ for the terminal and the timing measurements $T^s_1, T^s_2, \ldots T^s_m$, for the first radio transmission source. Determining $\Delta d_m$ may include determining a weight w with 0<w<1; assigning $\Delta d_1 = 0$; assigning $\Delta T^s_i = T^s_i - T^s_{i-1}$ and; $\Delta T^*_i = T^*_i - T^*_{i-1}$ (1<i≦m) and; determining $\Delta d_i$ from $\Delta d_{i-1}$ according to $\Delta d_i = w\Delta d_{i-1} + (1-w)(\Delta T^s_i - \Delta T^*_i)/\Delta T^*_i$ for each value of i ranging from i=2 to i=m. The values T1* and T2* may be, respectively, the first and second instants in time according to the timing reference of the terminal, and $\Delta T^*$ and $\Delta T^{**}$ may be, respectively, the first and the second intervals of time, where each of the timing measurements $T^s_1, T^s_2, \ldots T^s_m$ (m>1) occurred prior to T2*, $\Delta T^* = T2^* - T1^*$; and $\Delta T^{**} = \Delta T^* + \Delta d_m \Delta T^*$.

In some embodiments, the method 300 may include establishing or determining one or more weights w and/or providing information regarding one or more of the weights, radio timing measurements, timing adjustment, drifts, etc. to another device.

Adjustment of Radio Timing Measurements Using a Weighted Average

In another embodiment of adjusting a timing reference for a terminal, a time reference at time $T_2$ for some radio source n is obtained from a weighted average of two (or more) adjusted measurements for the radio source n, one made at some earlier time $T_1$ and one at some later time $T_3$. Each radio timing measurement is adjusted to give a time reference at the required time $T_2$ and the resulting adjusted time references are then averaged with the weight for each adjustment being inversely proportional to the time interval (according to the wireless terminal time source) over which the adjustment was made. In other embodiments, other weighting or averaging schemes may be used. The resulting weighted average can be shown to be free of errors due to drift in the timing references for both the terminal and the external radio source as follows.

From equation (2), the weighted average of the two adjustments is given by:

$$T^n(T_2)^w = \text{Approximate derived value of } T^n \quad (37)$$
$$(T_2) \text{ using a weighted average}$$

$$= [[T^n(T_1) + (T^*_2 - T^*_1)]/(T^*_2 - T^*_1) + \quad (38)$$
$$[T^n(T_3) + (T^*_3 - T^*_2)]/(T^*_3 - T^*_2)]/$$
$$W(T^*_1, T^*_3)$$

$$\text{where } W(T^*_1, T^*_3) = 1/(T^*_2 - T^*_1) + 1/(T^*_3 - T^*_2) \quad (39)$$

The error in the calculated value of $T^n(T_2)^w$ is the given by:

$$E(T^n(T_2)^w / \quad (40)$$
$$T^n(T_1)T^n(T_3)) = \text{error in deriving } T^n(T_2)^w \text{ using } T^n(T_1)$$
$$\text{and } T^n(T_3)$$
$$= T^n(T_2)^w - T^n(T_2)$$
$$= [[(T^*_2 - T^*_1) - (T^n(T_2) - T^n(T_1))]/(T^*_2 - T^*_1) +$$
$$[(T^n(T_3) - T^n(T_2)) - (T^*_3 - T^*_2)]/(T^*_3 - T^*_2)]/$$
$$W(T^*_1, T^*_3)$$

For errors in $T''(T)$ and $T^*$ given as in equations (7) and (8) by drift and wobble components, equation (40) becomes:

$$E(T^n(T_2)^w / \quad (41)$$
$$T^n(T_1)T^n(T_3)) = [[(d^* - d^n)(T_2 - T_1) + ((X^*(T_2) - X^*(T_1)) -$$
$$(X^n(T_2) - X^n(T_1)))/(T^*_2 - T^*_1) +$$
$$[(d^n - d^*)(T_3 - T_2)] + ((X^n(T_3) - X^n(T_2)) -$$
$$(X^*(T_3) - X^*(T_2)))/(T^*_3 - T^*_2)]/W(T^*_1, T^*_3)$$
$$= [(d^* - d^n)(T_2 - T_1)/((T_2 - T_1) +$$
$$d^*(T_2 - T_1) + ((X^*(T_2) - X^*(T_1))) +$$
$$[((X^*(T_2) - X^*(T_1)) - (X^n(T_2) - X^n(T_1))]/$$
$$(T^*_2 - T^*_1) + (d^n - d^*)(T_3 - T_2)/((T_3 - T_2) +$$
$$d^*(T_3 - T_2) + ((X^*(T_3) - X^*(T_2))) +$$
$$[((X^n(T_3) - X^n(T_2)) - (X^*(T_3) - X^*(T_2))]/$$
$$(T^*_3 - T^*_2)]/W(T^*_1, T^*_3)$$

$$\approx [[((X^*(T_2) - X^n(T_2)) - (X^*(T_1) - X^n(T_1))]/ \quad (42)$$
$$(T^*_2 - T^*_1) + [((X^*(T_2) - X^n(T_2)) -$$
$$(X^*(T_3) - X^n(T_3))]/(T^*_3 - T^*_2)]/$$
$$W(T^*_1, T^*_3)$$

$$= [((X^{*n}(T_2) - X^{*n}(T_1))/(T^*_2 - T^*_1) + ((X^{*n}(T_2) - \quad (43)$$
$$(X^{*n}(T_3))/((T^*_3 - T^*_2)]/W(T^*_1, T^*_3)$$
$$= X^{*n}(T_2) - [X^{*n}(T_1)/(T^*_2 - T^*_1) +$$
$$X^{*n}(T_3)/(T^*_3 - T^*_2)]/W(T^*_1, T^*_3)$$

where $X^{*n}$ (T) is as defined in equation (15).

In obtaining equation (42) from equation (41), small second order terms involving the product of two or more drift or wobble factors have been ignored. It can be seen from equation (42) that the error due to drift has been eliminated leaving only a weighted average of the wobble components. In equation (43), it is clarified that the wobble component consists of the difference in wobbles, $X^{*n}$ ($T_2$), between the terminal and the radio source n at the required measurement time $T_2$ less a weighted average of the difference in wobbles at the actual measurement times $T_1$ and $T_3$.

The above derivation can be extended to a weighted average of any even number of measurements. In this case, the resulting equations corresponding to (38), (39), (40) and (43) are derived as follows. Let measurements, $T''(T_1)$, $T''(T_2)$, ... $T''(T_{2M})$, of the radio source n timing be made at 2M sequential times $T^*_1, T^*_2, \ldots T^*_{2M}$ (M≧1) according to the terminal and corresponding to actual times $T_1$, $T_2, \ldots T_{2M}$. Suppose the radio source n timing is required at any other time T corresponding to a time T* according to the wireless terminal where T* differs from the other time values $T^*_1, T^*_2, \ldots T^*_{2M}$ and where $T^*$ exceeds the first m such time values and is less the remaining 2M-m time values ($0 \leq m \leq 2M$).

Let $\delta_i$ provide the arithmetic signs, plus or minus, for the weighting factors where $$\delta_i = +1 \text{ except as follows } (1 \leq i \leq 2M) \quad (44)$$

if m<M: set $\delta_i = -1$ for any (M-m) indices i in the range (m+1, m+2, ... 2M)
that give $\Sigma(i=1 \text{ to } i=2M)\delta_i/|T^*_{i-T^*}|\neq 0$ if m>M: set $\delta_i = -1$ for any (m-M) indices i in the range (1, 2, ... m)
that give $\Sigma(i=1 \text{ to } i=2M)\delta_i/|T^*_i-T^*|\neq 0$ if m=M: all the values $\delta_i$ are +1

Provided $T^*$ is an increasing function of T, the correct time T corresponding to $T^*$ will exceed the first m time values in the set $T_1, T_2, \ldots T_{2M}$ and will be less than the remaining 2M-m values in the set. The properties of the $\delta_i$ values in (44) then ensure that exactly M values in the set $\{\delta_1(T_1-T), \delta_2(T_2-T), \ldots \delta_1(T_{2M}-T)\}$ will be positive and exactly M negative.

Based on the above, then:

$$T^n(T)^w = \text{Approximate derived value of } T^n(T) \quad (45)$$
using a weighted average $$= [[T^n(T_1) - (T_1^* - T^*)\delta_1/|T_1^* - T^*| + \quad (46)$$
$$[T^n(T_2) - (T_2^* - T^*)\delta_2/|T_2^* - T^*| \ldots +$$
$$[T^n(T_{2M}) - (T_{2M}^* - T^*)\delta_{2M}/|T_{2M}^* - T^*|]]/$$
$$W(T_1^*, T_2^*, \ldots, T_{2M}^*)$$

where $W(T_1^*, T_2^*, \ldots, T_{2M}^*) = \delta_1/|T_1^* - T^*| + \quad (47)$
$$\delta_2/|T_2^* - T^*| + \ldots +$$
$$\delta_{2M}/|T_{2M}^* - T^*|$$

$$E(T^n(T)^w / T^n(T_1), \quad (48)$$
$$T^n(T_2), \ldots T^n(T_{2M})) = \text{error in deriving } T^n(T)^w \text{ using } T^n(T_1),$$
$$T^n(T_2), \ldots T^n(T_{2M})$$
$$= T^n(T)^w - T^n(T)$$
$$= [[T^n(T_1) - T^n(T)) - (T_1^* - T^*)]\delta_1/$$
$$|T_1^* - T^*| + [(T^n(T_2) - T^n(T)) - (T_2^* - T^*)]$$
$$\delta_2/|T_2^* - T^*| \ldots + [(T^n(T_{2M}) - T^n(T)) -$$
$$(T_{2M}^* - T^*))\delta_{2M}/|T_{2M}^* - T^*|]]/$$
$$W(T_1^*, T_2^*, \ldots, T_{2M}^*)$$
$$= [[(d^n - d^*)(T_1 - T) + ((X^n(T_1) - X^n(T)) -$$
$$(X^*(T_1) - X^*(T))]\delta_1/|T_1^* - T^*| +$$
$$[(d^n - d^*)(T_2 - T) + ((X^n(T_2) - X^n(T)) -$$
$$(X^*(T_2) - X^*(T))]\delta_2/|T_2^* - T^*| \ldots +$$
$$[(d^n - d^*)(T_{2M} - T) + ((X^n(T_{2M}) - X^n(T)) -$$
$$(X^*(T_{2M}) - X^*(T))]\delta_{2M}/|T_{2M}^* - T^*|] /$$
$$W(T_1^*, T_2^*, \ldots, T_{2M}^*)$$
$$\approx [[((X^*(T) - X^n(T)) - (X^*(T_1) - X^n(T_1))] \quad (49)$$
$$\delta_1/|T_1^* - T^*| + [((X^*(T) - X^n(T)) -$$
$$(X^*(T_2) - X^n(T_2))]\delta_2/|T_2^* - T^*| \ldots +$$
$$[((X^*(T) - X^n(T)) - X^*(T_{2M}) - X^n(T_{2M}))]$$
$$\delta_{2M}/|T_{2M}^* - T^*|] / W(T_1^*, T_2^*, \ldots, T_{2M}^*)$$

-continued
$$= [((X^{*n}(T) - X^{*n}(T_1))\delta_1/|T_1^* - T^*| + \quad (50)$$
$$((X^{*n}(T) - X^{*n}(T_2)) - \delta_2/|T_2^* - T^*| \ldots +$$
$$((X^{*n}(T) - X^{*n}(T_{2M}))\delta_{2M}/|T_{2M}^* - T^*|]/$$
$$W(T_1^*, T_2^*, \ldots, T_{2M}^*)$$
$$= X^{*n}(T) - [X^{*n}(T_1)\delta_1/|T_1^* - T^*| +$$
$$X^{*n}(T_2)\delta_2/|T_2^* - T^*| + \ldots +$$
$$X^{*n}(T_{2M})\delta_{2M}/|T_{2M}^* - T^*|]/$$
$$W(T_1^*, T_2^*, \ldots, T_{2M}^*)$$

Equation (49) follows from (48) due to the properties of the $\delta_1$ A values and neglecting all small second order terms. In equation (50), the resulting error tends towards the wobble difference at time T between the timing reference of the terminal and the timing reference of the radio source n, since the weighted average of the remaining wobble terms will tend to zero for a large number 2M of measurements. Equation (50) shows that obtaining an adjusted timing reference for some external radio source using a weighted average of a large number of radio timing measurements for this radio source will eliminate errors due to drift and leave only an error mainly due to the wobble in the external timing reference at the time for which the adjusted timing reference is obtained.

As described earlier herein, timing drift in the radio source can be partly (or wholly) due to relative motion of the radio source with respect to the wireless terminal and thus the elimination of drift in equation (50) will also eliminate errors due to such motion provided the unknown relative axial velocity of the radio source with respect to the terminal remains approximately constant during the period over which measurements are adjusted.

Figure 4:
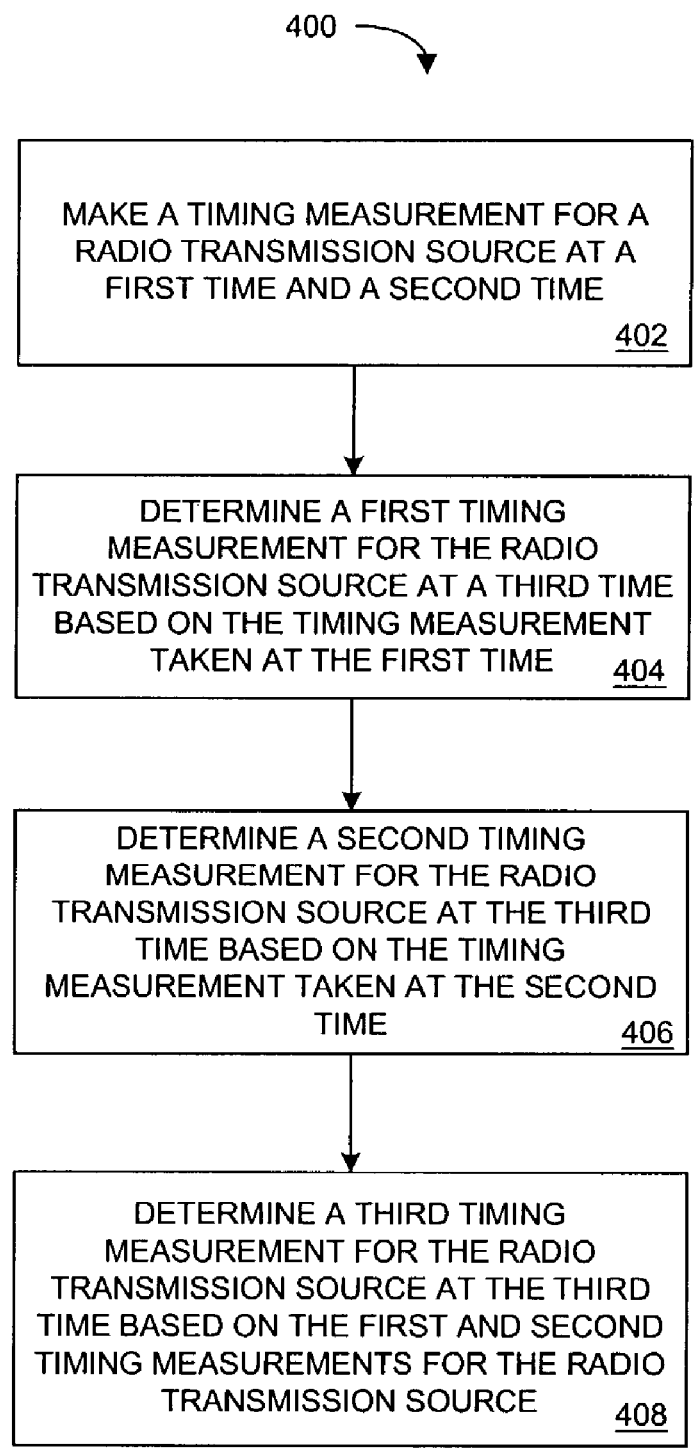
FIG. 4 is a flowchart of a second embodiment of a method in accordance with the present invention.

Now referring to FIG. 4, a flowchart 400 illustrates an embodiment of a method in accordance with the present invention that can be used to implement the process described above. In some embodiments, the method 400 may be implemented by a terminal such as, for example, the terminal 116. During a step 402, the terminal 116 makes a radio timing measurement for the source 102 for a first time and a second time. In some embodiments, the terminal 116 may make radio timing measurements for the source at more than two times. In some embodiments, the step 402 may include making a first timing measurement for a radio transmission source at a time $T^*_x$ according to a timing reference in the terminal and making a second timing measurement for the radio transmission source at a time $T^*_y$ according to a timing reference in the terminal.

During a step 404, the terminal 116 determines a first radio timing measurement for the source 102 at a third time based on the radio timing measurement made by the terminal 116 for the source 102 at the first time. The third time may be before or after the first time. In some embodiments, the step 404 may include determining a radio timing measurement for the radio transmission source at a time $T^*$, which may be based on the first radio timing measurement.

During a step 406 the terminal 116 determines a second radio timing measurement for the source 102 at the third time based on the radio timing measurement made by the terminal 116 for the source 102 at the second time. The third time may be before or after the second time. In some embodiments, the step 406 may include determining a radio timing measurement for the radio transmission source at a time T*, which may be based on the second radio timing measurement.

During a step 408, the terminal 116 determines a third radio timing measurement for the source 102 at the third time, the third radio timing measurement being based, at least in part, on the measurements determined during the steps 404 and 406. In some embodiments, the step 408 may include determining a radio timing measurement for the radio transmission source at the time T* based, at least in part, on the earlier radio timing measurements. The time $T^*_x$ and/or the time $T^*_y$ may occur before or after the time T*. In some embodiments, the step 408 may include determining a weighted average radio timing measurement.

In some embodiments, the method 400 may include establishing or determining one or more weights $\delta_i$ and/or providing information regarding one or more of the weights, radio timing measurements, timing adjustment, drifts, etc. to another device. If more than two radio timing measurements are made for the source 102 during the step 402, the method 400 may include determining additional radio timing measurements for the source 102 at the third time based on the additional radio timing measurements made during the step 402 and using these additional measurements in the determination of the third radio timing measurement.

In some embodiments, the method 400 may include making timing measurements for the radio transmission source at 2M (M≧1) sequential times $T^*_1, T^*_2, \ldots, T^*_{2M}$ according to a timing source in the terminal, wherein the making the first and second timing measurements for the radio transmission source at the respective times $T^*_x$ and $T^*_y$ is part of the making timing measurements for the radio transmission source at the 2M sequential times $T^*_1, T^*_2, \ldots, T^*_{2M}$. In addition, in some embodiments, the method 400 may include determining a timing measurement for the radio transmission source at the time T* from each of the 2M timing measurements for the radio transmission source at the 2M sequential times. Furthermore, in some embodiments, the method 400 may include determining another timing measurement for the radio transmission source at the time T* based, at least in part, on the 2M timing measurements for the radio transmission source at the time T* determined from each of the 2M sequential timing measurements at the times $T^*_1, T^*_2, \ldots, T^*_{2M}$. Determining another timing measurement may employ a weighted average of the 2M timing measurements for the radio transmission source at the time T* where the weight for any timing measurement at the time T* determined from a timing measurement at time $T^*_i$, (1≦i≦2M) is $\delta_i/|T^*-T^*_i|$ where $\delta_i$=+1 or $\delta_i$=−1. The value T* may exceed each of the time values $T^*_1, T^*_2, \ldots, T^*_m$ and be less than each of the time values $T^*_{m+1}, T^*_{m+2}, \ldots, T^*_{2M}$ where 0≦m≦2M and $\delta_i$ (1≦i≦2M) is chosen so that $\delta_i$=+1 except as follows; if m<M: $\delta_i$=−1 for any (M−m) indices i in the range (m+1, m+2, ... 2M) that give $\Sigma$(i=1 to i=2M) $\delta_i/|T^*_i-T^*|\neq 0$; if m>M: $\delta_i$=−1 for any (m−M) indices i in the range (1, 2, ... m) that give $\Sigma$(i=1 to i=2M) $\delta_i/|T^*_i-T^*|\neq 0$; and if m=M: all the values $\delta_i$ are +1.

Combination of Methods

In some embodiments, the methods 300, 400 described above may allow a terminal to calculate the timing reference from some external radio transmission source at any given instant in time based on one (method 300) or more (method 400) measurements of the timing from this radio source at other instants in time. When the timing references for both the external radio source and the terminal contain error components consisting of a constant drift and a random wobble, application of the methods 300, 400 can reduce or even eliminate any error in the calculated time reference due solely to drift. This enables timing references for multiple radio sources to be calculated for the same instant in time. In the case of the E-OTD position method for GSM, that would mean obtaining OTD values for neighbor base stations at a common instant in time without errors due to any clock drifts for base stations and a wireless terminal. In the case of GSM, the clock drift for any base station can be as high as 0.05 ppm while the clock drift for a wireless terminal can be up to 0.1 ppm.

Depending on the relative directions of clock drift (e.g., see equation (14)), the error component in a timing reference calculated without using the methods 300, 400 could be as high as the sum of both drifts multiplied by the interval of time over which the timing reference is adjusted. For example, with a measurement adjusted forwards or backwards in time over five seconds and with the worst case drift sum of 0.15 ppm, the error would be 0.75 μs. In more typical cases where the actual drifts are less than the maximums permitted by GSM standards, errors of some significance may still arise.

The benefit of reducing or eliminating errors in radio timing measurements using methods 300, 400 is now demonstrated for the particular application of determining the position of a GSM wireless terminal using the E-OTD positioning method. This method obtains a terminal position from OTD measurements made by the terminal and from RTD measurements typically made by separate fixed Location Measurement Units (LMUs) in the following manner.

Let $RTD_i$=Real Time Difference between any GSM base station i (e.g., the source 102) and some reference base station n (e.g., the source 110) at a time T″(T) according to the reference base station n. Real time difference is the amount of time between the start of transmission of a new GSM timeslot from the reference base station and the start of the transmission of the next timeslot from the neighbor base station as would be observed if an absolute time source was measuring this next to each base station. The real time differences would normally be measured by GSM LMUs and provided to the network (e.g., to a central network entity such as a GSM Serving Mobile Location Center or SMLC). Other methods of obtaining real time differences without the use of LMUs are not precluded, however. If the real time difference $RTD_i$ had not been obtained at exactly the time T″(T) but at some other time, the real time difference at T″(T) could be obtained from its functional relationship to the reference base station time. For example, if $RTD_i$ was increasing or decreasing at a constant rate, the $RTD_i$ at T″(T) could be obtained by simple interpolation or extrapolation of $RTD_i$ values obtained close to T″(T).

Let $OTD_i$=Observed Time Difference at the terminal 116 between base station i and reference base station n at the reference base station time T″(T). Observed time difference is the apparent RTD observed by the terminal 116. $OTD_i$ would either be reported by the terminal 116 or derived from full measurements of the timing $T^i$(T) of the base station i and the timing T″(T) of the reference base station n, if these were reported. Thus, the OTD values would be obtained from the measurements provided by the terminal 116.

Let $GTD_i$=Geometric Time Difference between base station i and reference base station n at the reference base station time $T''(T)$.

$$=OTD_i-RTD_i \quad (51)$$

Let $(x_i, y_i)$=horizontal coordinates of base station i (e.g., the source 102).

$(X_n, y_n)$=horizontal coordinates of reference base station n (e.g., the source 110).

Then, ignoring differences in altitude coordinates, which are normally not significant, the following equation well known to those versed in the art will apply.

$$GTD_i=[[(y-y_i)^2+(x-x_i)^2]^{1/2}-[(y-y_n)^2+(x-x_n)^2]^{1/2}]/c \quad (52)$$

Equation (52) relates the (unknown) horizontal coordinates, x and y, of the terminal 116 at time T to the (known) coordinates of the reference and neighbor base stations and the (known) measurement of timings made by the terminal 116 (OTD) and by some monitoring device like an LMU (RTD). The relationship is that the terminal 116 coordinates lie along a certain hyperbola defined by the other known values in this equation. Measurements for two such equations would generally suffice to obtain both coordinates uniquely as the point of intersection of the two hyperbolae, although more equations resulting from measurements on more than just two neighbor base stations would usually improve accuracy.

The effect on the resulting location estimate of reducing errors in the OTD measurements for E-OTD is now determined. From equation (52), there is a relationship between the GTD for any pair of base stations measured by a wireless terminal and the location coordinates of the wireless terminal. This relationship can be expressed in the form:

$$M=f(x, y) \quad (53)$$

where $M=[GTD_i c]$ from equation (52)
x, y=x, y, respectively, in equation (52)
$f(x, y)=[(y-y_i)^2+(x-x_i)^2]^{1/2}-[(y-y_n)^2+(x-x_n)^2]^{1/2}$ The x and y coordinates of the wireless terminal would be obtained in part from M using equation (53). If there was some error in M, there would be some error in x and y. Since M (or $GTD_i c$) is the difference between a measured OTD value and an RTD from equation (51) multiplied by the velocity of light c, any reduction of error in the OTD value (after multiplication by c) would imply an equal reduction of error in M. To determine the effects of an error in M on x and y, proceed as follows.

Taking partial derivatives gives:

$$dM=f_x dx + f_y dy \quad (54)$$

where $f_x=\partial f(x,y)/\partial x$ (55)

$f_y=\partial f(x,y)/\partial y$ (56)

Let $ds=(dx^2+dy^2)^{1/2}$ (57)

$$\alpha = \tan^{-1}(dy/dx) \quad (58)$$

$$= \sin^{-1}(dy/ds) \quad (59)$$

$$= \cos^{-1}(dx/ds) \quad (60)$$

Figure 5:
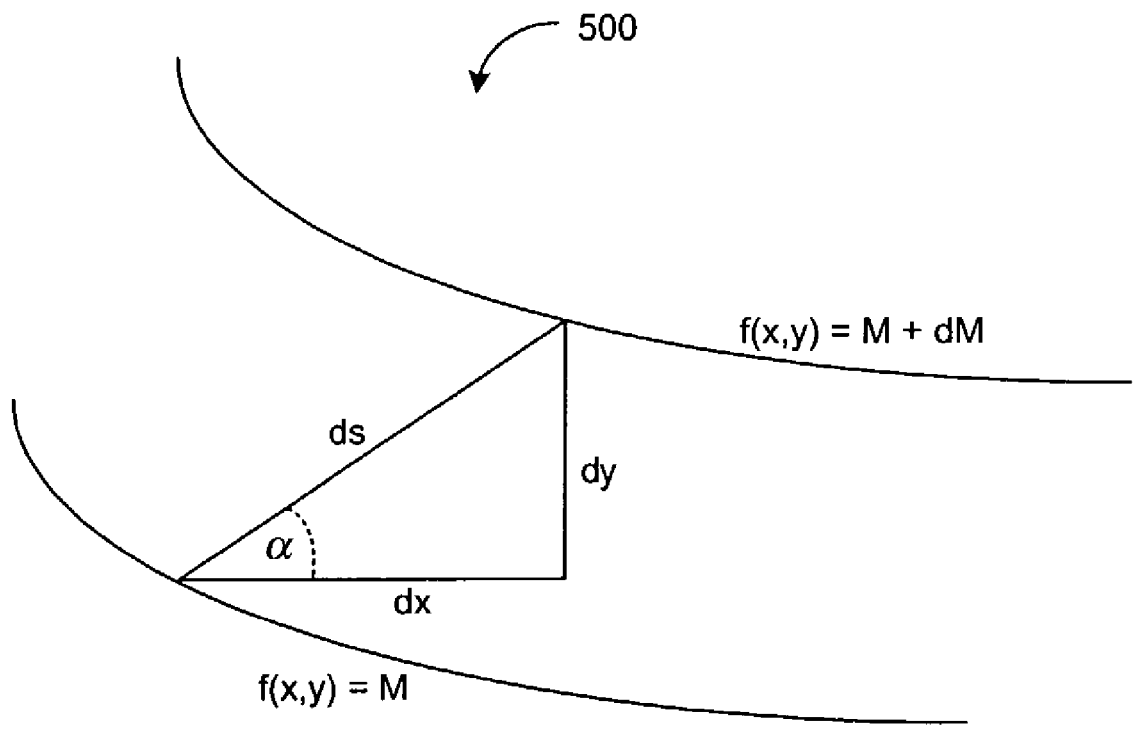
FIG. 5 is a diagram of a relationship between a geometric time difference for any pair of base stations measured by a terminal and the location coordinates of the terminal.

In equation (54), dM is the change in M associated with a change dx and dy in the calculated coordinates of the wireless terminal. In equation (57), ds is the total length in the change in the calculated position of the wireless terminal. In equations (58), (59) and (60), angle α is the angle subtended between dx and ds, as illustrated by graph 500 in FIG. 5.

From equations (54), (59) and (60):

$$dM/ds = f_x \cos(\alpha) + f_y \sin(\alpha) \quad (61)$$

$$d(dM/ds)/d\alpha = -f_x \sin\alpha + f_y \cos(\alpha) \quad (62)$$

$$= 0 \text{ when } \tan(\alpha) = f_y/f_x \quad (63)$$

The values of the angle α for which dM/ds in equation (61) attains its maximum positive and negative values is obtained when the derivative of dM/ds with respect to α in equation (62) is zero. This is the value of α given in equation (63). This value of α will thus minimize |ds/dM|, i.e., it will minimize the amount ds by which the calculated location of the wireless terminal as computed using equation (53) changes due to some change in M—for example, an error in the measured value of M. This quantity (minimum |ds/dM|) is well known in the art as "the geometric dilution of precision" (GDOP) for any equation relating a location measurement (e.g., GTD) to the coordinates of the entity being measured. From the preceding, it is given by:

$$GDOP = \text{minimum value of } |ds/dM| \quad (65)$$

$$= |1/(f_x \cos(\alpha) + f_y \sin(\alpha))| \text{ with } \tan(\alpha) = f_y/f_x$$

$$= |(f_x^2 + f_y^2)^{-1/2}|$$

Equations (53) and (65) enable values for the GDOP to be obtained for different geometrical relationships of the wireless terminal, reference and neighbor base stations. Investigation of GDOP values has already occurred for E-OTD (and other position methods) and, as is well known in the art, typical values range from around 0.5 up to around 5.0. The significance of any GDOP value is that it implies the error in a location estimate due to an error in some measurement. In the case of E-OTD, an error in an OTD factor due to uncompensated clock drift (after multiplication by the velocity of light c) will thus result in a location error of generally between 0.5 and 5.0 times the OTD error. From the previous examples, worst case OTD errors of up to 0.75 μs were shown. This corresponds to a distance of approximately 225 meters when multiplied by c. The corresponding location error would then be 112.5 to 1125 meters for a GDOP range of 0.5 to 5. For a more realistic OTD error of say 0.075 μs due to drift factors one tenth of the maximum allowed by GSM standards, the location error range solely due to uncompensated drift would still be 11.2 to 112.5 meters in this example. Although these are only examples, they illustrate the kind of location error contributions for E-OTD that could be mostly eliminated by the application of the timing adjustment methods claimed here.

Terminal

Figure 6:
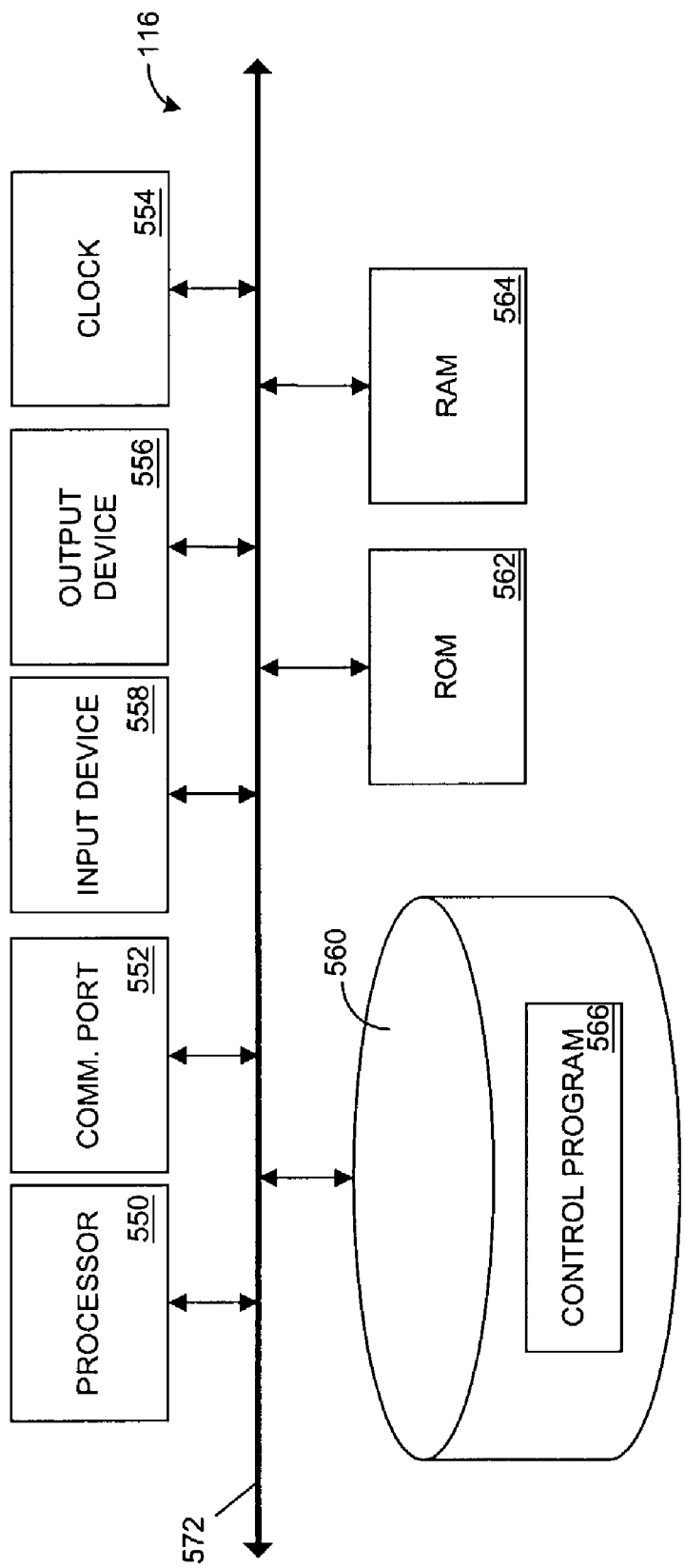
FIG. 6 is a block diagram of system components for an embodiment of the terminal of FIG. 1.

Now referring to FIG. 6, a representative block diagram of a terminal 116 is illustrated. The terminal 116 may include a processor, microchip, central processing unit, or computer 550 that is in communication with or otherwise uses or includes one or more communication ports 552 for communicating with devices, the network 120, etc. Communication ports may include such things as local area network adapters, wireless communication devices or components, wireless telephone communication ports, etc. In some embodiments, a communication port 552 may allow the terminal 116 to receive radio timing or other information.

The terminal 116 also may include an internal clock element or timing reference 554 to maintain an accurate time and date for the terminal 116, create time stamps for communications received or sent by the terminal 116, create time stamps for measurements made by the terminal 116, etc. In some embodiments, the processor 550 may be operative to implement one or more steps of the methods disclosed herein.

If desired, the terminal 116 may include one or more output devices 556 such as a printer, infrared or other transmitter, antenna, audio speaker, display screen or monitor, text to speech converter, etc., as well as one or more input devices 558 such as a bar code reader or other optical scanner, infrared or other receiver, antenna, magnetic stripe reader, image scanner, roller ball, touch pad, joystick, touch screen, microphone, computer keyboard, miniature keyboard, computer mouse, etc. In some embodiments, an input device may allow the terminal 116 to receive radio timing or other information.

In addition to the above, the terminal 116 may include a memory or data storage device 560 to store information, software, databases, communications, device drivers, measurements, etc. The memory or data storage device 560 preferably comprises an appropriate combination of magnetic, optical and/or semiconductor memory, and may include, for example, Read-Only Memory (ROM), Random Access Memory (RAM), a tape drive, flash memory, a floppy disk drive, a Zip™ disk drive, a compact disc and/or a hard disk. The terminal 116 also or alternatively may include separate ROM 562 and RAM 564.

The processor 550 and the data storage device 560 in the terminal 116 each may be, for example: (i) located entirely within a single computer or other computing device; or (ii) connected to each other by a remote communication medium, such as a serial port cable, telephone line or radio frequency transceiver. In some embodiments, the terminal 116 may comprise one or more computers that are connected to a remote terminal computer for maintaining databases.

A conventional personal computer or workstation with sufficient memory and processing capability may be used as the terminal 116. The terminal 116 preferably is capable of high volume transaction processing, performing a significant number of signal processing, mathematical and logical calculations for communications and database searches. A Pentium™ microprocessor, such as the Pentium III™ or IV™ microprocessor manufactured by Intel Corporation, may be used for the processor 550. Other or equivalent processors are available from Motorola, Inc., AMD, or Sun Microsystems, Inc. The processor 550 also may comprise one or more microprocessors, computers, computer systems, etc.

Software may be resident and operating or operational on the terminal 116. The software may be stored on the data storage device 560 and may include a control program 566 for operating the terminal, databases, etc. The control program 566 may control the processor 550. The processor 550 preferably performs instructions of the control program 566, and thereby operates in accordance with the present invention, and particularly in accordance with the methods described in detail herein. The control program 566 may be stored in a compressed, uncompiled and/or encrypted format. The control program 566 furthermore includes program elements that may be necessary, such as an operating system, a database management system and device drivers for allowing the processor 550 to interface with peripheral devices, databases, etc. Appropriate program elements are known to those skilled in the art, and need not be described in detail herein.

According to an embodiment of the present invention, the instructions of the control program may be read into a main memory from another computer-readable medium, such as from the ROM 562 to the RAM 564, or the control program or portions of it may be read in from some other external entity or device using the communication port 552 of the input device 558. Execution of sequences of the instructions in the control program causes the processor 550 to perform the process steps described herein. In alternative embodiments, hard-wired circuitry may be used in place of, or in combination with, software instructions for implementation of some or all of the methods of the present invention. Thus, embodiments of the present invention are not limited to any specific combination of hardware and software.

The processor 550, communication port 552, clock 554, output device 556, input device 558, data storage device 560, ROM 562, and RAM 564 may communicate or be connected directly or indirectly in a variety of ways. For example, the processor 550, communication port 552, clock 554, output device 556, input device 558, data storage device 560, ROM 562, and RAM 564 may be connected via a bus 572.

While specific implementations and hardware/software configurations for the terminal 116 have been illustrated, it should be noted that other implementations and hardware/software configurations are possible and that no specific implementation or hardware configuration is needed. Thus, not all of the components illustrated in FIG. 6 may be needed for a terminal implementing the methods disclosed herein.

The methods of the present invention may be embodied as a computer program developed using an object oriented language that allows the modeling of complex systems with modular objects to create abstractions that are representative of real world, physical objects and their interrelationships. However, it would be understood by one of ordinary skill in the art that the invention as described herein could be implemented in many different ways using a wide range of programming techniques as well as general-purpose hardware systems or dedicated controllers. In addition, many, if not all, of the steps for the methods described above are optional or can be combined or performed in one or more alternative orders or sequences without departing from the scope of the present invention and the claims should not be construed as being limited to any particular order or sequence, unless specifically indicated.

Each of the methods described above can be performed on a single computer, computer system, microprocessor, etc. In addition, two or more of the steps in each of the methods described above could be performed on two or more different computers, computer systems, microprocessors, etc., some or all of which may be locally or remotely configured. The methods can be implemented in any sort or implementation of computer software, program, sets of instructions, code, ASIC, or specially designed chips, logic gates, or other hardware structured to directly effect or implement such software, programs, sets of instructions or code. The computer software, program, sets of instructions or code can be storable, writeable, or savable on any computer usable or readable media or other program storage device or media such as a floppy or other magnetic or optical disk, magnetic or optical tape, CD-ROM, DVD, punch cards, paper tape, hard disk drive, Zip™ disk, flash or optical memory card, microprocessor, solid state memory device, RAM, EPROM, or ROM.

Although the present invention has been described with respect to various embodiments thereof, those skilled in the art will note that various substitutions may be made to those embodiments described herein without departing from the spirit and scope of the present invention.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

What is claimed:

1. A method for improving the accuracy of a radio timing measurement made by a terminal, comprising:
    making a first radio timing measurement for a radio transmission source at a time $T^*_x$ according to a timing reference in said terminal;
    making a second radio timing measurement for said radio transmission source at a time $T^*_y$ according to a timing reference in said terminal;
    determining a third radio timing measurement for said radio transmission source at a time $T^*$ according to a timing reference in said terminal based, at least in part, on said first radio timing measurement;
    determining a fourth radio timing measurement for said radio transmission source at said time $T^*$ based, at least in part, on said second radio timing measurement;
    determining a fifth radio timing measurement for said radio transmission source at said time $T^*$ based, at least in part, on said third radio timing measurement and said fourth radio timing measurement;
    making radio timing measurements for said radio transmission source at 2M ($M \geq 1$) sequential times $T^*_1$, $T^*_2$, ..., $T^*_{2M}$ according to a timing source in said terminal, wherein said making said first and second radio timing measurements for said radio transmission source at said respective times $T^*_x$ and $T^*_y$ is part of said making timing measurements for said radio transmission source at said 2M sequential times $T^*_1$, $T^*_2$, ..., $T^*_{2M}$;
    determining a radio timing measurement for said radio transmission source at said time $T^*$ for each of said 2M timing measurements for said radio transmission source at said 2M sequential times; and
    determining a sixth radio timing measurement for said radio transmission source at said time $T^*$ based, at least in part, on said 2M radio timing measurements for said radio transmission source at said time $T^*$ determined from each of said 2M sequential radio timing measurements at times $T^*_1$, $T^*_2$, ..., $T^*_{2M}$, wherein said determining a sixth radio timing measurement employs a weighted average of said 2M radio timing measurements for said radio transmission source at said time $T^*$ where the weight for any radio timing measurement at said time $T^*$ determined from a radio timing measurement at time $T^*_i$, ($1 \leq i \leq 2M$) is $\delta_i/|T^*-T^*_i|$ where $\delta_i=-1$ or $\delta_i=+1$, wherein $T^*$ exceeds each of the time values $T^*_1$, $T^*_2$, ..., $T^*_m$ and is less than each of the time values $T^*_{m+1}$, $T^*_{m+2}$, ..., $T^*_{2M}$ where $0 \leq m \leq 2M$ and $\delta_i (1 \leq i \leq 2M)$ is chosen so that:
    $\delta_i = +1$ except as follows;
    if m<M: $\delta_i=-1$ for any (M−m) indices i in the range (m+1, m+2, ..., 2M) that give $\Sigma(i=1 \text{ to } i=2M) \delta_i/|T^*_i-T^*| \neq 0$;
    if m>M: $\delta_i=-1$ for any (m−M) indices i in the range (1, 2, ..., m) that give $\Sigma(i=1 \text{ to } i=2M) \delta_i/|T^*_i-T^*| \neq 0$;
    if m=M: all the values $\delta_i$ are +1.

2. The method of claim 1, wherein said time $T^*_x$ and said time $T^*_y$ occur after said time $T^*$.

3. The method of claim 1, wherein said time $T^*_x$ and said time $T^*_y$ occur before said time $T^*$.

4. The method of claim 1, wherein said time $T^*$ occurs after said time $T^*_x$ and before said time $T^*_y$.

5. The method of claim 1, wherein said determining a fifth radio timing measurement for said radio transmission source at said time $T^*$ includes determining a weighted average radio timing measurement.

6. The method of claim 1, further comprising:
    determining a timing drift difference between said terminal and a second radio transmission source based, at least in part, on a radio timing measurement for said second radio transmission source at a time T1 and a radio timing measurement for said second radio transmission source at a time T2; and
    determining an adjustment to said timing reference in said terminal based, at least in part, on said timing drift difference.

7. An apparatus for improving the accuracy of radio timing measurement information for a terminal, comprising:
    a memory;
    a communication port; and
    a processor connected to said memory and said communication port, said processor being operative to:
    making a first radio timing measurement for a radio transmission source at a time $T^*_x$ according to a timing reference in said terminal;
    making a second radio timing measurement for said radio transmission source at a time $T^*_y$ according to a timing reference in said terminal;
    determining a third radio timing measurement for said radio transmission source at a time $T^*$ according to a timing reference in said terminal based, at least in part, on said first radio timing measurement;
    determining a fourth radio timing measurement for said radio transmission source at said time $T^*$ based, at least in part, on said second radio timing measurement;
    determining a fifth radio timing measurement for said radio transmission source at said time $T^*$ based, at least in part, on said third radio timing measurement and said fourth radio timing measurement;
    making radio timing measurements for said radio transmission source at 2M ($M \geq 1$) sequential times $T^*_1$, $T^*_2$, ..., $T^*_{2M}$ according to a timing source in said terminal, wherein said making said first and second radio timing measurements for said radio transmission source at said respective times $T^*_X$ and $T^*_y$ is part of said making timing measurements for said radio transmission source at said 2M sequential times $T^*_1$, $T^*_2$, ..., $T^*_{2M}$;
    determining a radio timing measurement for said radio transmission source at said time $T^*$ for each of said 2M timing measurements for said radio transmission source at said 2M sequential times; and
    determining a sixth radio timing measurement for said radio transmission source at said time $T^*$ based, at least in part, on said 2M radio timing measurements for said radio transmission source at said time $T^*$ determined from each of said 2M sequential radio timing measurements at times $T^*_i, T^*_2, \ldots, T^*_{2M}$, wherein said determining a sixth radio timing measurement employs a weighted average of said 2M radio timing measurements for said radio transmission source at said time $T^*$ where the weight for any radio timing measurement at said time $T^*$ determined from a radio timing measurement at time $T^*_1$, $(1 \leq i \leq 2M)$ is $\delta_i/|T^*-T^*_i|$ where $\delta_i=+1$ or $\delta_i=-1$, and wherein $T^*$ exceeds each of the time values $T^*_1, T^*_2, \ldots, T^*_m$ and is less than each of the time values $T^*_{m+1}, T^*_{m+2}, \ldots, T^*_{2M}$ where $0 \leq m \leq 2M$ and $\delta_i (1 \leq i \leq 2M)$ is chosen so that:

$\delta_i=+1$ except as follows;

if m<M: $\delta_i=-1$ for any (M−m) indices i in the range (m+1, m+2, . . . , 2M) that give $\Sigma(i=1$ to $i=2M)$ $\delta_i/|T^*_1-T^*|\neq 0$;

if m>M: $\delta_i=-1$ for any (m−M) indices i in the range (1, 2, . . . m) that give $\Sigma(i=1$ to $i=2M)$ $\delta_i/|T^*_i-T^*|\neq 0$;

if m=M: all the values $\delta_i$ are +1.

8. A computer program product in a computer readable medium for improving the accuracy of a radio timing measurement for a terminal, comprising:

instructions for making a first radio timing measurement for a radio transmission source at a time $T^*_x$ according to a timing reference in said terminal;

instructions for making a second radio timing measurement for said radio transmission source at a time $T^*_y$ according to a timing reference in said terminal;

instructions for determining a Third radio timing measurement for said radio transmission source at a time $T^*$ according to a timing reference in said terminal based, at least in part, on said first radio timing measurement;

instructions for determining a fourth radio timing measurement for said radio transmission source at said time $T^*$ based, at least in part, on said second radio timing measurement;

instructions for determining a fifth radio timing measurement for said radio transmission source at said time $T^*$ based, at least in part, on said third radio timing measurement and said fourth radio timing measurement;

instructions for making radio timing measurements for said radio transmission source at 2M (M≧1) sequential times $T^*_1, T^*_2, \ldots, T^*_{2M}$ according to a timing source in said terminal, wherein said making said first and second radio timing measurements for said radio transmission source at said respective times $T^*_x$ and $T^*_y$ is part of said making timing measurements for said radio transmission Source at said 2M sequential times $T^*_1, T^*_2, \ldots, T^*_{2M}$;

instructions for determining a radio timing measurement for said radio transmission source at said time $T^*$ for each of said 2M timing measurements for said radio transmission source at said 2M sequential times; and instructions for determining a sixth radio timing measurement for said radio transmission source at said time $T^*$ based, at least in part, on said 2M radio timing measurements for said radio transmission source at said time $T^*$ determined from each of said 2M sequential radio timing measurements at times $T^*_1, T^*_2, \ldots, T^*_{2M}$, wherein said determining a sixth radio timing measurement employs a weighted average of said 2M radio timing measurements for said radio transmission source at said time $T^*$ where the weight for any radio timing measurement at said time $T^*$ determined from a radio timing measurement at time $T^*_1$, $(1 \leq i \leq 2M)$ is $\delta_i/|T^*-T^*_i|$ where $\delta_i=+1$ or $\delta_i=-1$, and wherein $T^*$ exceeds each of the time values $T^*_1, T^*_2, \ldots, T^*_m$, and is less than each of the time values $T^*_{m+1}, T^*_{m+2}, \ldots, T^*_{2M}$ where $0 \leq m \leq 2M$ and $\delta_i$ $(1 \leq i \leq 2M)$ is chosen so that:

$\delta_i=+1$ except as follows;

if m<M: $\delta_i=-1$ for any (M−m) indices i in the range (m+1, m+2, . . . 2M) that give $\Sigma(i=1$ to $i=2M)$ $\delta_i/|T^*_i-T^*|\neq 0$;

if m>M: $\delta_i=-1$ for any (m−M) indices i in the range (1, 2, . . . m) that give $\Sigma(i=1$ to $i=2M)$ $\delta_i/|T^*_1-T^*|\neq 0$;

if m=M: all the values $\delta_i$ are +1.

* * * * *